US012596086B2

(12) United States Patent
Meyer et al.

(10) Patent No.: US 12,596,086 B2
(45) Date of Patent: Apr. 7, 2026

(54) SENSOR ASSEMBLY FOR A DIFFERENTIAL SCANNING CALORIMETER

(71) Applicant: Mettler-Toledo GmbH, Greifensee (CH)

(72) Inventors: Thomas Meyer, Zürich (CH); Thomas Huetter, Niederrohrdorf (CH)

(73) Assignee: Mettler-Toledo GmbH, Greifensee (CH)

( * ) Notice: Subject to any disclaimer, the term of this patent is extended or adjusted under 35 U.S.C. 154(b) by 371 days.

(21) Appl. No.: 18/371,640

(22) Filed: Sep. 22, 2023

(65) Prior Publication Data

US 2024/0102870 A1    Mar. 28, 2024

(30) Foreign Application Priority Data

Sep. 26, 2022    (EP) ..................................... 22197864

(51) Int. Cl.
*G01N 25/48* (2006.01)
(52) U.S. Cl.
CPC ....... *G01N 25/4866* (2013.01); *G01N 25/486* (2013.01)
(58) Field of Classification Search
CPC ... G01K 17/00; G01N 25/4866; G01N 25/486
USPC .............................. 374/12, 13, 31
See application file for complete search history.

(56) References Cited

U.S. PATENT DOCUMENTS

| | | | | |
|---|---|---|---|---|
| 5,288,147 A | * | 2/1994 | Schaefer | G01K 17/00 374/10 |
| 9,927,379 B2 | | 3/2018 | Wettstein et al. | |
| 2003/0231693 A1 | * | 12/2003 | Hutter | G01N 25/4866 374/12 |
| 2005/0169344 A1 | * | 8/2005 | Hutter | G01K 7/02 374/E7.004 |
| 2015/0268182 A1 | * | 9/2015 | Wettstein | G01N 25/4833 29/832 |
| 2016/0047700 A1 | * | 2/2016 | Danley | G01K 3/08 374/31 |
| 2017/0045466 A1 | * | 2/2017 | Noritake | G01K 7/02 |
| 2024/0118226 A1 | * | 4/2024 | Meyer | G01K 17/04 |

FOREIGN PATENT DOCUMENTS

| | | | | | |
|---|---|---|---|---|---|
| CN | 208206851 U | * | 12/2018 | | |
| EP | 1215484 A2 | * | 6/2002 | ......... | G01N 25/4866 |
| FR | 2856794 A1 | | 12/2004 | | |
| FR | 2856794 B1 | * | 12/2004 | | |
| WO | 2006/114394 A1 | | 11/2006 | | |

* cited by examiner

*Primary Examiner* — Mirellys Jagan
(74) *Attorney, Agent, or Firm* — Standley Law Group LLP; Jeffrey S. Standley; Adam J. Smith

(57) ABSTRACT

A sensing unit for a differential scanning calorimeter includes a superposition of layers of a thermoelectric arrangement, a layer of an electrical heater arrangement and a layer of an absolute temperature measurement arrangement. The thermoelectric arrangements, the electrical heater arrangements and the absolute temperature measurement arrangements are symmetrically arranged on a sample-side and a reference-side of the sensor.

9 Claims, 4 Drawing Sheets

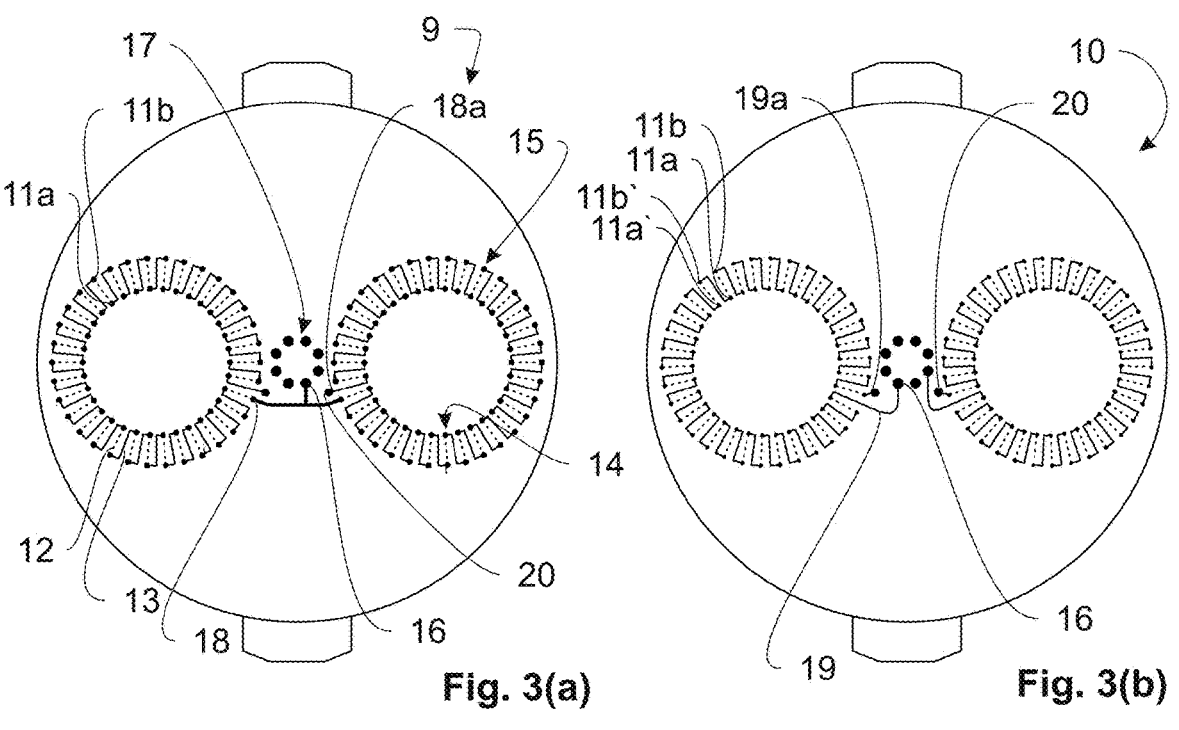
Fig. 3(a)
Fig. 3(b)
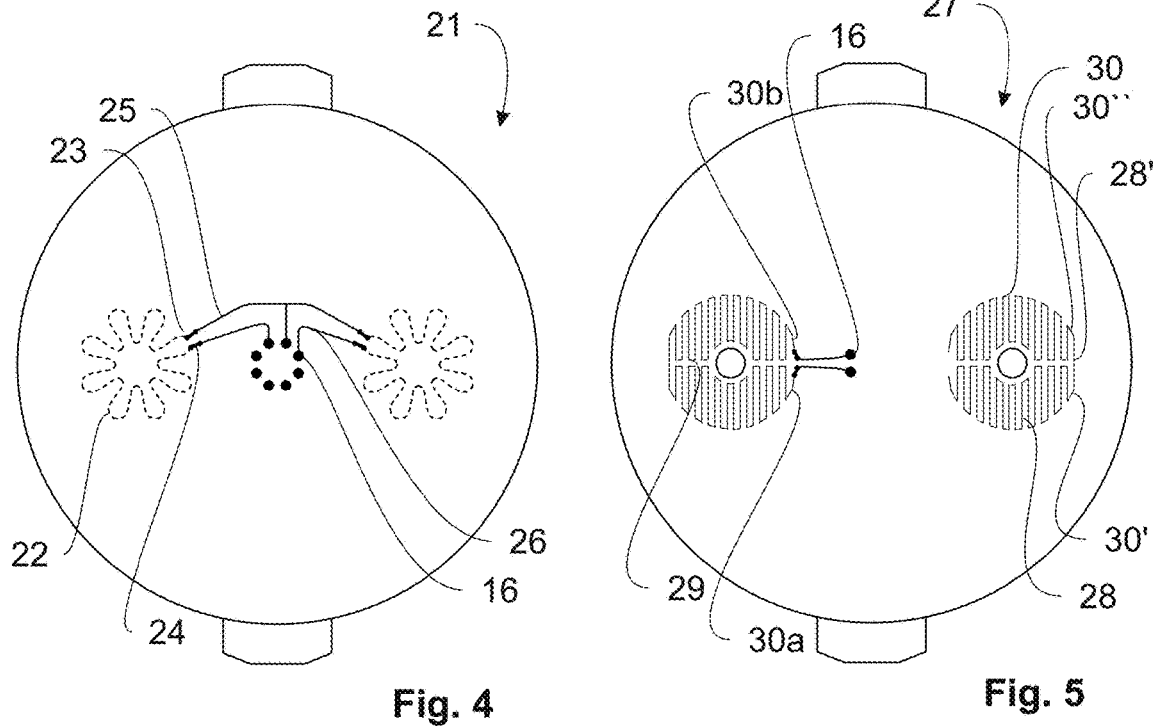
Fig. 4
Fig. 5

SENSOR ASSEMBLY FOR A DIFFERENTIAL SCANNING CALORIMETER

CROSS-REFERENCE TO RELATED APPLICATIONS

This application claims the benefit of European Patent Application No. 22197864.6 filed Sep. 26, 2022, the disclosures of which are hereby incorporated by reference as if fully restated herein.

TECHNICAL FIELD

The present invention relates to a sensing unit and a sensor assembly comprising the sensing unit for a differential scanning calorimeter (DSC).

BACKGROUND AND SUMMARY OF THE INVENTION

Widely known differential scanning calorimeters comprise a heat source whose temperature is controlled in accordance with a predetermined temperature program. A sensor assembly is thermally coupled to the heat source to thereby establish a sample-side and a reference-side flow path for heat to flow to a sample position and a reference position, respectively, of the sensor assembly.

In heat flux differential scanning calorimeters, the measurement signals correspond to temperature differences resulting from the rate of flow of heat between the heat source and the sample and reference positions, respectively. In power compensation differential scanning calorimeters, the measuring signals correspond to electric power necessary to compensate the heat flow to be measured.

It is an object of the present invention to provide a sensing unit of a sensor assembly for a differential scanning calorimeter allowing for operation in both, the heat flux operating mode and in the power compensation operating mode, and having improved measurement characteristics.

This object is achieved by a sensing unit for a differential scanning calorimeter comprising a disc-like substrate. The disc-like substrate is suitable for being mounted in heat conductive contact with a temperature-controlled heat source of said differential scanning calorimeter. Additionally, the sensing unit comprises a sample-side pan support region adapted to receive thereon in heat conductive contact therewith a bottom of a sample pan and a reference-side pan support region adapted to receive thereon in heat conductive contact therewith a bottom of a reference pan. The sensing unit comprises further a sample-side thermoelectric arrangement for generating between two terminal portions of the sample-side thermoelectric arrangement a sample-side electrical voltage signal, and a reference-side thermoelectric arrangement for generating between two terminal portions of the reference-side thermoelectric arrangement a reference-side electrical voltage signal. The sample-side electrical voltage signal is indicative of flows of heat across a sample-side measuring region. The reference-side electrical voltage signal is indicative of flows of heat across a reference-side measuring region. The sensing unit comprises further a sample-side electrical heater arrangement beneath said sample-side pan support region and a reference-side electrical heater arrangement beneath said reference-side pan support region.

Preferably, the sensing unit is formed in a thermodynamically symmetrical arrangement relative to a plane perpendicular to the disc-like substrate and crossing a center point of the disc-like substrate. In this embodiment, the center point of the disc-like substrate is the center point of the sensing unit.

Preferably, the sample-side measuring region and reference-side measuring region are arranged at the outer circumferential region of the disc-like substrate.

Preferably, the thermoelectric arrangements are located in the measuring regions.

The heat source can be controlled independently of the sample-side and/or the reference-side electrical heater arrangements.

The sample-side pan support region respectively the reference-side pan support region has preferably an extent equal to or greater than the bottom of the sample pan respectively the reference pan.

The presence of sample-side and reference-side electrical heater arrangements allows the use of the power compensation mode in a differential scanning calorimeter where both, sample and reference are located in the same volume which temperature is controlled by the same heat source and which is preferably a furnace.

The sample-side and reference-side electrical heater arrangements allow it further to increase the time resolution of the sensor assembly comprising the sensing unit.

In one embodiment, the sample-side measuring region surrounds the sample-side pan support region and the reference-side measuring region surrounds the reference-side pan support region.

The different "regions" of the sensing unit are characterised by their area and position relative to the sensing unit and extend through the thickness of the sensing unit. The term "surrounding" should be understood in a broad sense to allow an overlap. In the embodiment at hand, for example, the measuring region could have the shape of a hollow cylinder with an inner and an outer radius and the pan support region could have the shape of a cylinder with an outer radius. The measuring region and the pan support region can be arranged concentrically. In such an embodiment, the measuring region surrounds the pan support region as long as the outer radius of the measuring region is greater than the outer radius of the pan support region, independent of the inner radius of the measuring region.

As the measuring regions surround the respective pan support regions, the sensing unit according to the invention has a greater tolerance regarding the placement of the sample pan and the placement of the reference pan. Therefore, the combination of measuring regions surrounding the pan support regions and the electrical heater arrangements allows particular robust and repeatable measurements over a wide range of time resolutions.

It is first of all noted that the expression "heat source" as used in this specification is preferably construed to also include a cold source so that the present specification applies to a heating mode of operation and a cooling mode of operation of the differential scanning calorimeter as well. Further, the temperature control of the heat source may include isothermal operation, wherein the temperature is constant, or dynamic operation, wherein the temperature follows a predetermined temperature program as a function of time, specifically a linear temperature ramp or is oscillating, in particular in the form of a modulated linear temperature ramp.

The heat flow at the sample-side and the reference-side, respectively, is according to Fourier's Law proportional to the temperature gradient along the flow path, and the sample-side and reference-side electrical voltage signals generated by the sample-side and reference-side thermoelectric arrangements, respectively, are thus indicative of the heat flows between the heat source and the sample-side and reference-side pan support regions, respectively.

In one embodiment, one terminal portion of the sample-side thermoelectric arrangement is connected with one terminal portion of the reference-side thermoelectric arrangement having the same polarity. In the following, these terminal portions, which are on the same potential during use, will be called "first terminal portions". In this embodiment, the differential voltage signal, which is a voltage signal indicative of the rate of differential heat flow between the sample-side and the reference-side, is available between the two terminal portions of the sample-side and reference-side thermoelectric arrangements, which are not connected with each other. In the following, these terminal portions, which can differ in their potential during use, will be called "second terminal portions".

In a preferred embodiment, the first terminal portions of the sample and the reference-side thermoelectric arrangement are connected with each other and to the same thermoelectric material while the thermoelectric junctions of the sample and the reference-side comprise the same combination of thermoelectric materials.

The sensing unit is preferably used in a power compensation operating mode. In this embodiment, the sample-side and reference-side electrical heater arrangements are energized to operate the differential scanning calorimeter in the power compensation operating mode. In this operating mode, the energization is controlled so as to cause the differential heat flow signal to approach zero. This may, for example, be implemented by applying the differential voltage signal to the input of a proportional controller that feeds the heater arrangements from the output side thereof.

Preferably, the differential voltage signal is measured between the second terminal portions of the sample-side and the reference-side thermoelectric arrangements while the first terminal portions of the sample-side and the reference-side thermoelectric arrangements, having the same polarity, are connected with each other. In another embodiment, the differential voltage signal is derived from the sample-side and reference-side electrical voltage signals, especially by calculating the difference.

In the power compensation mode, the power provided to the sample-side and the reference-side electrical heater arrangement is detected and used to determine the heat flow to or from the sample. In a preferred embodiment, the differential thermoelectric voltage is detected, too, and considered in the determination of the heat flow to or from the sample.

The sensing unit is preferably used in a heat flux operating mode. In this embodiment, the differential thermoelectric voltage, which is the difference between the sample-side and the reference-side thermoelectric voltage, is detected. In a heat flux operating mode, the sample-side and reference-side electrical heater arrangements are either not energized at all or they are energized according to a predetermined temperature program.

The disc-like substrate of the sensing unit is preferably a circular disc, preferably made of an aluminium oxide ceramic material, having a diameter of preferably more than 20 mm, preferably 24 mm or more.

Preferably, the disc-like substrate has an essentially plain upper side on which the various structural elements of the sensing unit are provided preferably by using multi-layer thick-film technology. Structural elements of the sensing unit are at least the thermoelectric arrangements and the electrical heater arrangements of both, the sample-side and the reference-side.

Preferably, the sensing unit comprises a multi-layered structure arranged on the disk-like substrate. Starting from the disk-like substrate, the multi-layered structure comprises preferably the following layers in the given sequence: a layer of electrical heater arrangements, an insulating layer, a second layer of thermoelectric arrangements, an insulating layer, a first layer of thermoelectric arrangement and an insulating layer. Preferably, these layers are applied using mulit-layer thick film technology. Preferably, also the insulating layers comprise electrically conductive material to establish through-contact connections between the first and the second layer of the thermoelectric arrangement as well as between the layer of the electrical heater arrangement and connector pads on the top surface of the sensing unit and between at least one of the layers of the thermoelectric arrangements and connector pads on the top surface of the sensing unit.

In accordance with another aspect of the invention, the thickness of said the disc-like substrate is reduced beneath said sample-side and reference-side measuring regions, respectively. Preferably, the thickness is also similarly reduced beneath the sample-side and reference-side pan support regions, respectively.

The thickness reduction, in particular beneath the sample-side and reference-side measuring regions, respectively, causes the heat to flow across the measuring regions along a measurement path that is confined between the upper surface of the disc-like substrate and the recessed lower surface thereof. This causes a better detection of the flow of heat by the thermoelectric arrangements that are located at the measuring regions.

The heat conductive contact between the disc-like substrate and the temperature-controlled heat source is preferably established by engagement between the upper end face of the furnace that serves as the heat source and the disc-like substrate, especially in the areas where the thickness of the disc-like substrate is greater than below the sample-side respectively the reference-side measuring regions.

Due to the high heat conductivity through the materials of furnace and disc-like substrate, the sample or the reference is mainly heated by heat flows through the measuring regions. The heat flows through the measuring regions can be detected by the thermoelectric arrangements.

In a preferred embodiment, the upper end face of the furnace comprises a layer of a material with a heat conductivity between 0.5 and 5 W/(m K), preferably between 1 and 2 W/(m K), for example of a glass-ceramic. Such a layer protects the sensing-unit from undesired fast temperature changes while its conductivity ensures at the same time that the heat flow through the measuring region is the dominant heat flow path.

The overall geometry of the sensing unit and the sensor assembly comprising the sensing unit is configured for thermodynamic symmetry so that ideally the conditions for heat to flow between the sample-side and reference-side pan support regions, respectively, and the heat source are identical.

In a preferred embodiment of the sensing unit each of said sample-side and reference-side thermoelectric arrangements comprises a plurality of thermoelectric junctions each formed by a first thermoelectric material in contact with a second thermoelectric material. The thermoelectric junctions of either one of the thermoelectric arrangements are connected in series and alternately located at positions that are mutually differently spaced from the respective pan support region.

This may specifically be implemented when both of said sample-side and reference-side pan support regions have an outer circular boundary and said differently spaced positions are located on an inner circle and on an outer circle. The inner circle is located concentrically and in close proximity to and radially outside of the outer circular boundary. The outer circle is located concentrically to the inner circle. The outer circle has a greater radius than the inner circle. The thermoelectric junctions on the inner circle are preferably equally spaced in the circumferential direction. Similarly, the thermoelectric junctions on the outer circle are in this embodiment equally spaced in the circumferential direction.

As the first thermoelectric material preferably gold (Au) is used, and as the second thermoelectric material a gold-palladium alloy (AuPd) is preferably used. The number of thermoelectric junctions on each of the inner and outer circles in a given layer of the thermoelectric arrangement is preferably greater than 30, and specifically equals 34.

Arranging pairs of junctions on concentric circles, preferably always one being radially outside of another one, and connecting them in series results in an improved measurement signal. Thermoelectric junctions using gold and a gold-palladium alloy can be produced in a reliable manner by thick-film technology. Arranging 30 to 34 junctions on each of the circles allows a reliable production.

It is further preferred that successive junctions in said series connection of junctions are interconnected in pairs by alternating traces of said first and second thermoelectric materials, respectively.

Preferably, each thermoelectric junction in the outer circle is located radially outwards to one of the thermoelectric junctions in the inner circle. Each of these pairs of thermoelectric junctions is connected by a radially extending trace of one of said first and second thermoelectric materials, respectively. A trace of the other one of said thermoelectric materials establishes a connection to circumferentially halfway between the adjacent inner junctions, then radially outwards until halfway between the adjacent outer junctions and then circumferentially until the adjacent outer junction. The latter is not the case for the terminal junctions of the series connection and the traces of said first and second thermoelectric materials are instead open-ended at the outer circle to be connected to the terminal portions for tapping the electrical voltage signal.

This embodiment minimizes the length of the traces needed to form the preferred thermoelectric arrangement and is therefore more reliable.

Preferably, the measuring region is the region between the inner and the outer circle.

Preferably each of said sample-side and reference-side thermoelectric arrangements have their thermoelectric junctions distributed to at least two layers arranged one above the other with an electrically insulating layer therebetween and said series connection being through contacted through said insulating layer.

Thereby the number of thermoelectric junctions in the overall series connection may be increased to become the sum of the junctions in each of the individual layers, and the sensitivity of the sensing unit and therefore of the junctions sensor assembly comprising the sensing unit is increased accordingly.

Preferably, the total number of thermoelectric junctions is therefore between 60 and 68.

In an expedient embodiment each of said sample-side and reference-side electrical heater arrangements comprises a resistive heating trace meandering between a central portion and a peripheral portion of said sample-side and reference-side pan support regions, respectively.

Specifically, the meandering trace extends between an outer limiting circle that is concentrically located within and in proximity to the outer circular boundary of the sample-side and reference-side pan support regions, respectively, and an inner limiting circle that is located radially inward of said outer limiting circle and concentrically thereto. The turning regions of the meander and the outer and inner limiting circles, respectively, touch at locations of mutually equal distances in the circumferential directions of the circles. With this meandering pattern uniform heating of the pan support region is advantageously attained.

Another expedient embodiment further comprises sample-side and reference-side absolute temperature measurement arrangements beneath said sample-side and reference-side pan support regions, respectively.

These absolute temperature measurement arrangements allow for absolute temperature measurements in close proximity to the sample and reference pans, respectively.

The temperature measurements may be used to estimate thermal resistances in the sensor assembly.

A sensing unit comprising sample-side and reference-side absolute temperature measurement arrangements can be used to measure the temperature of a samples. For measuring the temperature of the sample, the sensing unit is placed inside a temperature-controlled heat source of a differential scanning calorimeter. The sample is placed in a sample pan of a pan type on the sample-side pan support region. A signal of the sample-side absolute temperature measurement arrangement is used to determine the temperature of the sample. Preferably, the sample-side thermoelectrical voltage and/or the power provided to sample side electrical heater arrangement are also used to determine the temperature of the sample.

The absolute temperature measurement arrangement is arranged in very close proximity to the sample. Therefore, the signal produced by the absolute temperature measurement arrangement is a good estimate of the real temperature of the sample, especially in near steady-state conditions. In transient conditions, heat flows produced by the sample, the heat source and/or the electrical heater arrangement can heat or cool the absolute temperature measurement arrangement directly and cause a deviation between the sample temperature and the signal produced by the absolute temperature measurement arrangement. This deviation can be corrected by considering the sample-side thermoelectrical voltage and/or the power provided to the sample side electrical heater arrangement.

In an expedient embodiment each of said sample-side and reference-side absolute temperature measurement arrangements comprises a temperature sensitive resistive trace meandering in a pattern that is symmetric in relation to a central axis across said sample-side and reference-side pan support regions, respectively.

Specifically, the pan support region has a circular circumference and the axis of symmetry defines a diameter thereof. The legs of the meander that extend between the turning regions located in proximity to the circumference and in proximity to the axis of symmetry, respectively, are perpendicular to the latter one. The resistive trace may for instance be dimensioned to have a resistance value that varies between 20Ω at −150° C. and 175Ω at 700° C.

Preferably, the sample-side and reference-side absolute temperature measurement arrangements are further structural elements of the sensing unit, which are provided by using multi-layer thick-film technology.

Preferably, the sample-side and reference-side absolute temperature measurement arrangements are included in the multi-layered structure. The multi-layered structure of the sensing unit according to this embodiment comprises an additional electrically insulating layer and a layer of the absolute temperature measurement arrangements. The layer of the absolute temperature measurement arrangements is arranged between the upper side of the disc-like substrate and the layer of the electrical heater arrangements. The additional electrically insulating layer is arranged between the layer of the electrical heater arrangements and the layer of the absolute temperature measurement arrangements.

Starting from the disk-like substrate, the multi-layered structure of this embodiment comprises preferably the following layers in the given sequence: a layer of the absolute temperature measurement arrangements, an insulating layer, a layer of electrical heater arrangements, an insulating layer, a second layer of thermoelectric arrangements, an insulating layer, a first layer of thermoelectric arrangement and an insulating layer.

Preferably, also the insulating layers comprise electrically conductive material to establish through-contact connections between the first and the second layer of the thermoelectric arrangement as well as between the layer of the electrical heater arrangement and connector pads on the top surface of the sensing unit, between at least one of the layers of the thermoelectric arrangements and connector pads on the top surface of the sensing unit and between the layer of the absolute temperature measurement arrangements and the top surface of the sensing unit.

In a further embodiment, the sensing unit comprises a pan support. The pan support is a thin layer applied on top of the topmost electrically insulating layer but only locally on the sample-side and the reference-side pan support regions. In a preferred embodiment, the diameter of the sample-side and the reference side pan support regions and/or the pan support at the sample-side or the reference-side pan support region is slightly greater than the diameter of the bottom of the pan.

Small indentations, provided either in the pan support and/or in parts of the multi-layered structure can be arranged at the center points of the sample-side and the reference-side pan support regions. Together with pans comprising a centering pin, such indentations can facilitate the manual placement of the pans on the sensing unit.

Preferably, the pan support compensates for local surface ripple, which can be cause, for example, by the underlaying structures. The pan support provides a particularly flat surface and allows thereby a reduced thermal contact between the pan and the sensing unit.

A method to produce a sensing unit, comprises the steps of providing a disc-like substrate and applying the following layers successively on the disc-like substrate: the layer of the electrical heater arrangement, an electrically insulating layer, the second layer of the thermoelectric arrangement, an electrically insulating layer, the first layer of the thermoelectric arrangement, and an electrically insulating layer. Preferably, the layers are applied using thick-film technique, especially screen printing techniques.

The layer of the electrical heater arrangement layer comprises conductive traces forming the electrical heater arrangement, connector pads for the electrical heater arrangement and, if there are layers below, connector pads of said layers below.

The electrically insulating layers are electrically insulating with the only exception being the areas of the connector pads of the layer below it.

The second layer of the thermoelectric arrangement comprises traces forming at least some of the thermoelectric junctions of the sensing unit, connector pads for the second layer of the thermoelectric arrangement and connector pads of the layers below.

The first layer of the thermoelectric arrangement comprises traces forming at least some of the thermoelectric junctions of the sensing unit, connector pads for the first layer of the thermoelectric arrangement and connector pads of the layers below.

In a preferred embodiment, a layer of the absolute temperature measurement arrangement and an electrically insulating layer are arranged between the disc-like substrate and the layer of the electrical heater arrangement.

The layer of the absolute temperature measurement arrangement comprises the conductive traces forming the absolute temperature measurement arrangement and its connector pads.

In a preferred embodiment, material for a pan support is locally applied on the sample-side and the reference-side support region.

Producing the sensing unit by application of said layers allows an efficient and reliable production, especially if a thick-film technique such as screen printing is used.

In a preferred embodiment, the sensing unit further comprises a plurality of connector pads adapted for having external wiring connected thereto.

Preferably, the connector pads are located on a central circle, having a center point equal to the center point of the sensing unit and a diameter which is smaller than the difference between the distance between the center points of the sample-side and the reference-side pan support region and the diameter of one of the outer circles.

These connector pads serve to establish electrical communication between the electrical signals emitted from or applied to the sensing unit and external circuitry for the sensing unit.

Specifically, a first one of said connector pads has one of the terminal portions of said sample-side and said reference-side thermoelectric arrangements, respectively, jointly connected thereto, said connected ones of terminal portions having the same polarity, while the other ones of terminal portions of said sample-side and reference-side thermoelectric arrangements, respectively, are separately connected to a second and third one of said connector pads.

Therefore, the difference between the voltage signals from said sample-side and reference-side thermoelectric arrangements, respectively, is available between said second and third connector pads, while the individual voltage signals from the sample-side and reference-side thermoelectric arrangements are available between the first and second connector pads and the first and third connector pads, respectively.

Further, expediently, a fourth one of said connector pads has one of the power supply terminals of said sample-side and said reference-side heater arrangements, respectively, jointly connected thereto, while the other ones of power supply terminals of said sample-side and reference-side heater arrangements, respectively, are separately connected to a fifth and sixth one of said connector pads.

Thereby, the sample-side and reference-side heater arrangements, respectively, may be individually energized by applying power to the fourth and fifth or to the fourth and sixth connector pads, respectively.

Also expediently a seventh and eighth one of said connector pads are connected to opposite ends, respectively, of said resistive trace of said sample-side absolute temperature measurement arrangement.

Thereby, the absolute temperature at the sample-side pan support region may be measured by connecting corresponding circuitry to said seventh and eighth connector pads.

In an expedient embodiment no similar connections and pads are provided at the reference-side. The reference-side absolute temperature measurement arrangement of this embodiment is in fact only provided for the sake of thermal symmetry but is not used for temperature measurement.

According to another aspect of the present invention, the sensor assembly comprises the sensing unit and an elongate member extending along a longitudinal axis. One of the axial end portions of the elongate member comprises an electrical contact arrangement to thereby form a plug member to be brought into electrical contact with a complementarily formed socket member of said differential scanning calorimeter. Said electrical contact arrangement is electrically connected to said connector pads of said sensing unit.

Preferably, the external wiring establishes the electrical connection between the electrical contact arrangement and the connector pads of said sensing unit.

Specifically, the plug member may be configured to be connected with the socket member in an interlocking and/or force-fitting manner to thereby contact all of the connector pads at once in a particularly easy way. In a preferred embodiment, the electrical contact arrangement is located above a tip portion which comprises a guide surface. The guide surface is in circumferential direction asymmetric and ensures a predefined orientation of the plug member relative to the socket. In addition, the tip portion protects the contact arrangement during the insertion of the plug member.

Preferably, the sensor assembly comprises further a tensioning wire which is used to secure the sensing unit in the calorimeter by mechanical tension and to ensure a well-defined thermal contact between the furnace and the sensing unit, preferably its disc-like substrate. The tensioning wire is preferably looped though two small openings arranged side by side inside the central circle. The tensioning wire runs through the elongate member, leaves the elongate member at its tip portion and ends in a loop. An anchoring element of the calorimeter can engage with this loop. Preferably, the anchoring element exerts a spring force on the tensioning element and ensures thereby that the disc-like substrate of the sensing unit is pushed with a constant force onto the upper end face of the furnace.

In a preferred embodiment, the elongate member and the sensing unit of the sensor assembly do not touch each other once the sensor assembly is mounted. Preferably, the tensioning wire is chosen to have a diameter of less or equal to 0.2 mm to minimize the heat transfer between the sensing unit and the anchoring element.

Preferably the longitudinal axis is a central symmetry axis for the entire sensor assembly so that in particular the sample-side and reference-side pan support regions are symmetrically located on both sides of the axis while the plurality of connector pads is located on a circle centered around this axis.

Preferably said elongate member has a cylindrical outer circumference, said electrical contact arrangement comprises elongate contact lugs that extend parallel to said longitudinal axis and are mutually spaced in the circumferential direction and are connected with said connector pads by connecting wires that are arranged in an axially extending hollow space formed in said elongate member.

Preferably, the connecting wires form the external wiring.

Finally, a preferred embodiment of the sensing unit, further comprises at least one locating tab formed at the outer circumference of the disc-like substrate. The locating tab is configured to be brought into a positive fit with a complementarily formed positioning recess of said calorimeter.

Thereby, the angular orientation of the sensing unit with respect to the body of the calorimeter is precisely defined. Preferably, two diametrically opposed locating tabs are provided.

In one embodiment, the sensing unit is used to determine the heat flow to a first and a second sample simultaneously. Thereby, the first sample is placed in the sample pan which is arranged on the sample-side pan support region and the second sample is placed in the reference pan which is arranged on the reference-side pan support region. The heat flow to the first sample is determined using at least the sample-side electrical voltage signal. The heat flow to the second sample is determined using at least and reference-side electrical voltage signal.

Preferably, the heat flow to the first sample is determined using in addition the power provided to the sample-side electrical heater arrangement.

Preferably, the heat flow to the second sample is determined using in addition the power provided to the reference-side electrical heater arrangement.

The possibility of the sensing unit to determine both, the sample-side electrical voltage signal and the reference-side electrical voltage signal, allows to distinguish between the heat flows to and from the sample and the reference side. Placing a second sample on the reference side increases the throughput and is especially useful if a large number of samples should be compared with each other.

In one embodiment, the sensing unit is used to determine at least one of the parameters describing the complex heat capacity, preferably the phase angle of the complex heat capacity, of a sample. In this embodiment, the sample is placed in the sample pan which is arranged on the sample-side pan support region and the reference pan is arranged on the reference-side pan support region. The heating power is controlled as a function of time to follow a slowly changing or constant baseline which is modulated with a selected periodic power modulation. The sample-side electrical voltage signal, the reference-side electrical voltage signal and a temperature signal are measured. A functional relation between said sample-side electrical voltage signal, said reference-side electrical voltage signal and said temperature signal is evaluated to determine the desired parameter.

The periodic power modulation of the heating power causes a periodic heat flow to or from the sample in the absence of phase transitions. The situation can be described and the functional relation can be derived by analogy to a DC electric circuit where the reaction of components to an alternating current or voltage is characterized by the impedance. The complex heat capacity is a complex function describing the temperature of a sample in reaction to alternating heat flows. The complex heat capacity may depend on the mean temperature and the frequency of the power modulation. The phase angle describes the difference in the phase between the heat flow to and from the sample and the temperature of the sample in reaction of a sinusoidal heating power modulation. Parameters of the complex heat capacity are the real and the imaginary part of the complex heat capacity, the phase angle and the absolute value.

Preferably, the reference pan is empty. However, in another embodiment, a known reference is placed in the reference pan.

Preferably, here and in every other disclosed embodiment, the sample pan and the reference pan are of the same pan type and therefore of the same size, shape and material.

Evaluating both, the sample-side and the reference-side electrical voltage signals, allows to determine the complex heat capacity of the sensing unit components on the reference side and the pans of the pan type separately from the sensing unit components on the sample side and the sample pan comprising the sample. Therefore, the complex heat capacity of the sample can be evaluated by subtracting the effects of the sensing unit and the pan.

In a preferred embodiment, the slowly changing or constant baseline of the heating power is at least partially provided by the heat source while the periodic power modulation is provided by the sample-side and reference-side electrical heater arrangements. Preferably, the temperature signal is detected by at the sample-side and the reference-side absolute temperature measurement arrangements. The sample-side electrical voltage signal and the reference-side electrical voltage signal detect the heat flow to and from the sample and the reference.

Further features, advantages, and details result from the following description in which the invention will be explained in more detail with reference to the drawings.

BRIEF DESCRIPTION OF THE DRAWINGS

In the drawings:

FIG. 1b is an enlarged partial view of a plug member formed by an axial end portion of the elongated element of the sensor assembly of the embodiment shown in FIG. 1a;

FIG. 2a is a top view of the embodiment of FIG. 1a;

FIG. 2b is a view corresponding to FIG. 2a visualizing superimposed layers beneath the topmost layer shown in FIG. 2a;

FIG. 3a is a top view of a first layer of the thermoelectric arrangement located beneath the topmost layer illustrated in FIG. 2a;

FIG. 3b is a top view of a second layer of the thermoelectric arrangement located beneath the first layer of the thermoelectric arrangement illustrated in FIG. 3a;

FIG. 4 is a top view of a layer of the electrical heater arrangement comprising a resistive heater and which is located beneath the second layer of the thermoelectric arrangement illustrated in FIG. 3b;

FIG. 5 is a top view of a layer of the absolute temperature measurement arrangement which is situated beneath the layer of the electrical heater arrangement illustrated in FIG. 4;

DETAILED DESCRIPTION OF EXEMPLARY EMBODIMENT(S)

Figure 1A:
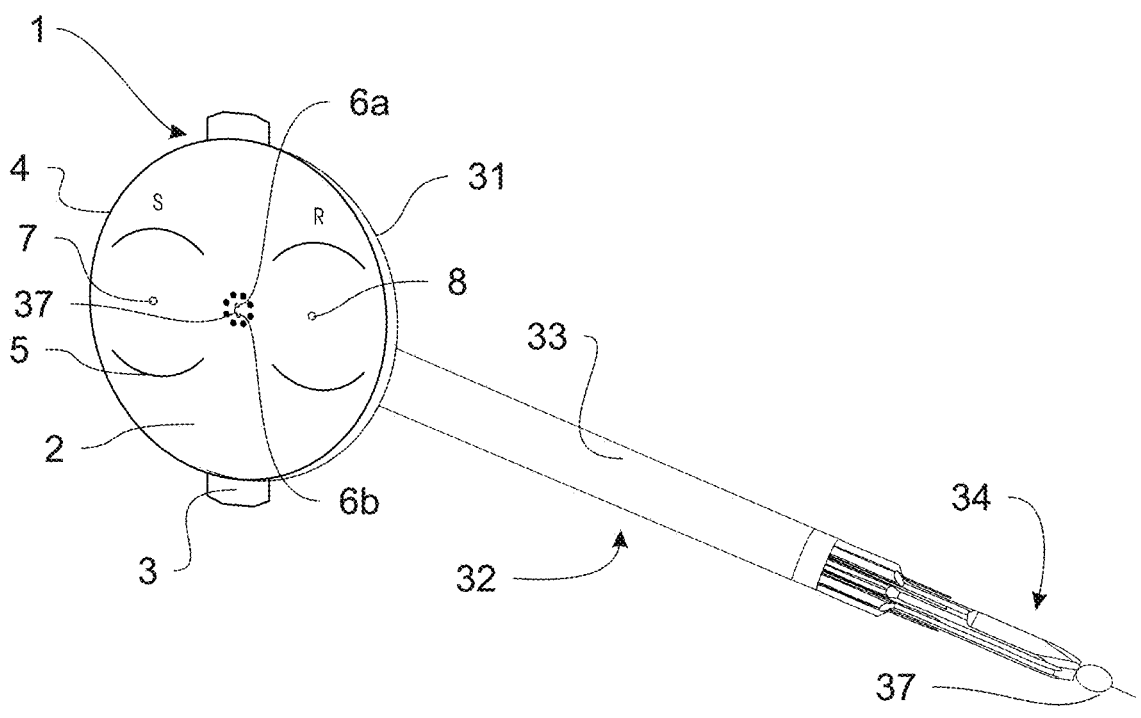
FIG. 1a is a perspective overall view of an exemplary embodiment of a sensor assembly in accordance with the invention.

As is illustrated in FIG. 1a, an embodiment of a sensor assembly in accordance with the invention comprises a sensing unit 1 having an essentially planar top surface 2 that is horizontally aligned when the sensor assembly is mounted for measurement operation in heat conductive contact with a temperature-controlled heat source of a differential scanning calorimeter. The sensing unit 1 has essentially the shape of a circular disc having two locating tabs 3 that project radially from the circular circumference 4 of the disc. These locating tabs 3 are in positive engagement with a complementary recess in a tubular wall of a furnace. The furnace forms the calorimeter's heat source. At the same time, annular zones of the bottom surface of the sensing unit 1 which surround the sample-side and the reference-sides measuring regions, where the disk-like substrate is recessed, are kept in heat conductive contact with an upper end face of the tubular furnace wall of the heat source.

Figures 2A, 2B:
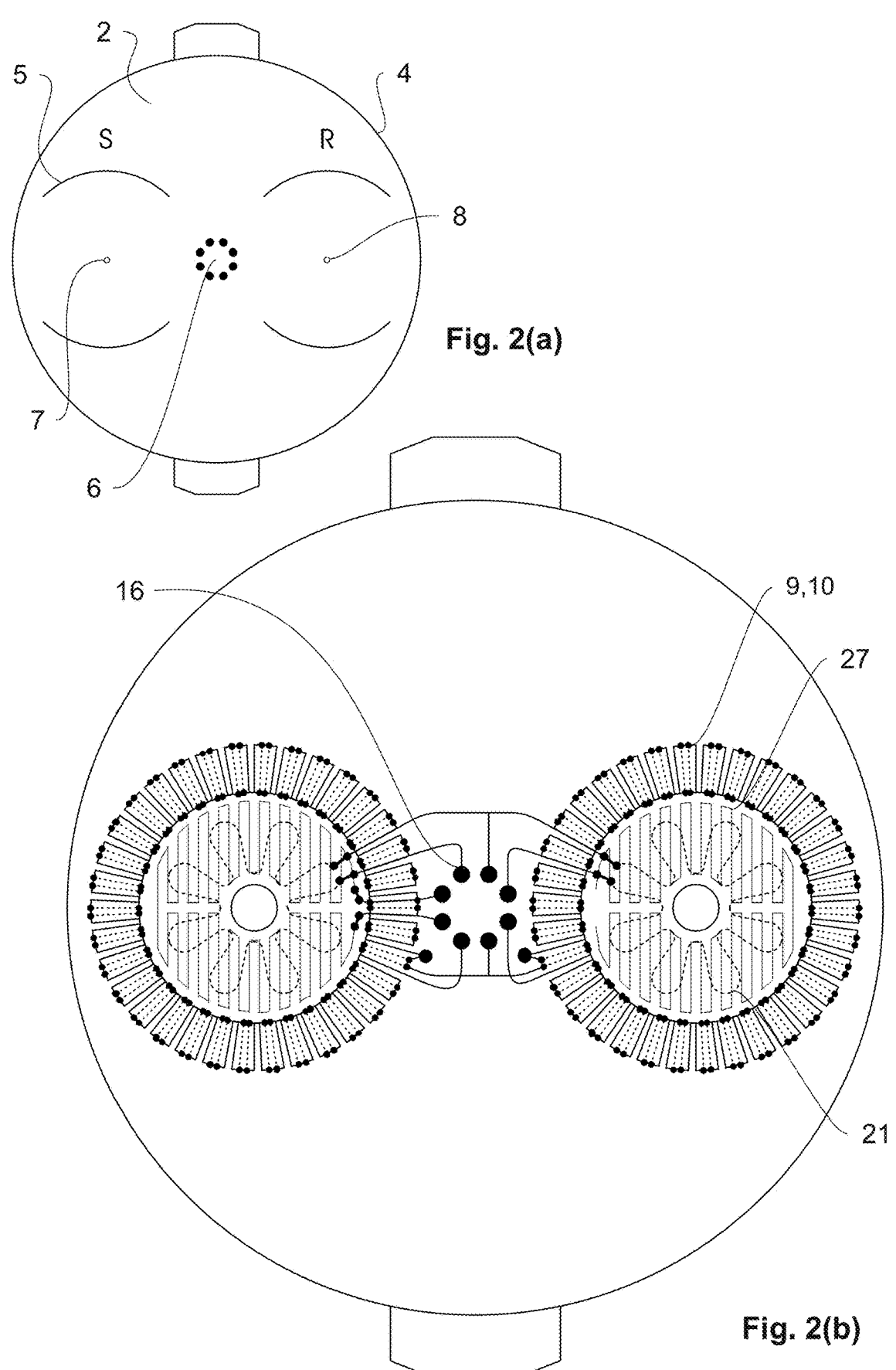

As may be seen in more detail in FIG. 2a, arc-shaped indications 5 for a sample-side pan support region S and a reference-side pan support region R are provided on the top surface 2 of the sensing unit 1, said pan support regions S, R being located diametrically and symmetrically with respect to the center point of the circular circumference 4 of the sensing unit 1. Each of the sample-side and reference-side pan support regions S, R has a circular shape with a respective center point. The center points of the sample-side and the reference-side pan support regions are lying on a straight line through the center point of the sensing unit 1 and are equidistant thereto. Small indentations 7, 8, located at the center point of the respective pan support region S, R, are provided in the topmost layer of the sensing unit 1. The user may utilize pans comprising a centring pin on their bottom which corresponds to one of the small indentations 7, 8. If such pans are used, the indentations 7, 8 facilitate a correct placement of the pans on the sensing unit.

Top surface 2 is the exposed side of a thin electrically insulating layer whose opposite lower surface is adjacent to a superposition of further layers that are, for the purposes of illustration, shown as translucent in FIG. 2b in order to demonstrate the spatial relations between their structures. The thin electrically insulating layer and the further layers form a multi-layer structure.

The uppermost layer of this multi-layer structure is a first layer 9 of a thermoelectric arrangement as shown in FIG. 3a, and a similar second layer 10 of thermoelectric arrangement shown in FIG. 3b is located beneath the first layer of FIG. 3a with a thin insulating layer therebetween. In these first and second layer 9, 10 of the thermoelectric arrangement a plurality of thermoelectric junctions 11a, 11b, each formed by a contact between a first 12 and a second 13 thermoelectric material, are located on a pair of inner and outer circles 14, 15 that are centered around the center points of the sample-side and reference-side pan support regions S, R, respectively. In each of the pairs of inner and outer circles 14, 15 the thermoelectric junctions 11a, b are distributed in the circumferential direction and pair-wisely radially spaced between the inner and outer circles 14, 15. The thermoelectric junctions 11a, b are formed as overlapping portions of traces of the first and second thermoelectric materials 12, 13 applied by thick-film technology. The traces of the first thermoelectric material 12 extend radially between radially opposite thermoelectric junctions 11a,b of the inner and outer circles 14, 15, while each of the traces of the second thermoelectric material 13 extends from a junction 11a on the inner circle 14 in its circumferential direction halfway to its neighbouring thermoelectric junction 11a and then radially outward halfway between the opposite thermoelectric junctions 11b, 11b' on the outer circle 15 and along the circumference of the outer circle 15 to the respective neighbouring thermoelectric junction 11b' on the outer circle 15.

Thereby, the arrangement of traces of thermoelectric material 12, 13 forms and connects the thermoelectric junctions 11*b*, 11*a*, 11*b*', 11*a*' that are alternately arranged on the inner and outer circles 14, 15 in series. The first and the second terminal portions of the series connection are formed by terminal traces 18, 19 that extend outwardly from circumferentially neighbouring thermoelectric junctions 11*b* in a region close to the center point 6 of the sensing unit 1. Connecting traces 18*a*, 19*a* and a set of through-contacts 20 is used to continue the series connection between the first 9 and the second 10 layer of the thermoelectric arrangement.

In a central region, located between the outer circles 15 of the sample-side and reference-side measuring regions, a plurality of connector pads 16 is equidistantly located on a central circle 17 that is centered around the center point 6 of the sensing unit 1. A first one of the connector pads 16 is jointly connected to the terminal traces 18 from the sample-side and reference-side thermoelectric series connections that are of the same electric polarity and in the first layer of thermoelements 9, thereby forming a center tab of the entire series connection. In both, the first 9 and the second 10 layer, connecting traces 18*a*, reps. 19*a* extend at both, the sample- and the reference-side, from a respective trace of thermoelectric material 12, 13 to the respective sample- or reference-side through-contact 20. The sample-side and reference-side terminal traces 19 are located in the second layer 10 of thermoelectric arrangement and they are connected to a second respectively a third one of the connector pads 16.

Beneath the second layer of thermoelements 10 and separated therefrom by an electrically insulating layer is a layer of an electrical heater arrangement 21 illustrated in FIG. 4. The layer of the electrical heater arrangement 21 comprises symmetrically configured sample-side and reference-side patterns of resistance heating traces 22 formed by thick-film technology. The heating patterns are confined within reference-side and sample-side outer heating circles, respectively, and sample-side and reference-side inner heating circles, respectively. The diameter of the sample-side and reference-side outer heating circles is close to but less than the diameters of the inner circles 14 of thermoelectric junctions 11*a* in the first and second layer of the thermoelectric arrangement 9, 10. Each of the resistive heating traces meanders between the respective inner and outer heating circle in that inner and outer turning portions touch the inner and outer heating circles in circumferentially equidistant points, while corresponding ends of the turning portions are connected by essentially radially extending essentially straight portions. In each of the sample-side and reference-side patterns one of the outer turning portions that is close to the central arrangement of connector pads 16 is interrupted to form two power supply terminals 23, 24. One of the sample-side and reference-side power supply terminals 23, respectively, are jointly connected to a fourth one of the connector pads 16 by a trace 25, while the other sample-side and reference-side power supply terminals 24 are separately connected to a fifth and a sixth one of said connector pads 16 by sample-side and reference-side traces 26, respectively.

Located beneath the layer of the electrical heater arrangement 21 and separated therefrom by an electrically insulating layer is a layer of an absolute temperature measurement arrangement 27 illustrated in FIG. 5. Equivalently configured sample-side and reference-side patterns of temperature-dependent resistive traces are formed around the center points of the sample-side and the reference-side pan support regions, respectively. The traces of each of the sample-side and the reference-side patterns, respectively, meander in accordance with a configuration that is symmetrical in relation to a straight line through center points of the sample-side pan support region, the reference-side pan support region and the sensing unit. The meander is composed of equidistant linear sections 28 that are pair-wisely connected by inner and outer turning sections 29 and 30, respectively. The outer turning sections 30 extend along the inner circle 14 of the thermoelectric junctions 11*a*, while the inner turning sections 29 extend along a line that has an approximately semi-circular portion centered around center points of the sample- or reference-side pan support region, respectively, and which follows the inner heating circle partially, and two linear sections joining the semi-circular portion and extending radially outwardly therefrom in parallel to the central line through center points of the sample-side pan support region, the reference-side pan support region and the sensing unit. The radially outermost linear sections 28' that face away from the central point 6 extend across the linear line of symmetry thereby connecting the outermost turning sections 30', 30" of the meander. The opposite outermost turning sections 30*a*, 30*b* that face the center point 6 are connected to a seventh and eighth one of the connector pads 16 by correspondingly configured traces on the sample-side, while the corresponding turning sections 30*a*, 30*b* on the reference-side end up blind.

The above-described superposition of layers 9, 10, 21 and 27 is formed on the upper side of a disc-like substrate 31 (FIG. 1*a*) so that center points of the sample-side pan support region, the reference-side pan support region and the sensing unit of each layer are located on respective axes that are normal to the upper side. Among these axes the one through the center point of the sensing unit is a main symmetry axis of the sensing unit 1. The sample-side and reference-side axes through the sample- and reference-side center points, respectively, are the symmetry axis of circular sample- and reference-side pan support regions, respectively, that are located within inner circles 14. The sample-side and reference-side axes through the sample- and reference-side center points, respectively, are also the symmetry axis of the sample-side and reference-side measuring regions, respectively, that are located between inner circle 14 and outer circle 15.

Figure 1B:
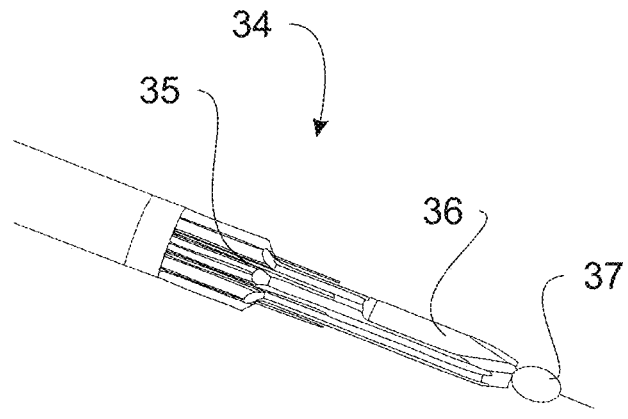

As may be seen in FIGS. 1*a* and 1*b*, an elongate member 32 is arranged at, but not directly attached, to the bottom side of the disc-like substrate 31. The elongate member 32 has a mainly cylindrical outer surface whose longitudinal axis coincides with the central axis of symmetry of sensing unit 1. Its axial end portion 34 opposite to the sensing unit 1 is formed as a plug member having axially extending contact lugs 35 located in circumferentially equidistant recesses formed in the outer surface 33. The outermost end is formed with an axially extending flat guide surface 36 to facilitate introduction into a complementarily formed socket member of the calorimeter in correct angular position.

Inside an axially extending hollow space, which is formed within the elongate member 32, connecting wires are accommodated which connect the contact lugs 35 of the plug member to the corresponding connector pads 16 of the sensing unit 1. It should be noted that the repetitive patterns of connector pads 16 on the various superposed layers of the multi-layer structure are in through-contact connection.

A tensioning wire 37 is used to mount the sensing unit 1 to the elongate member 32 and to allow axially tensioning engagement with an anchoring position within the calorimeter. The tensioning wire 37 is looped through two small openings 6*a*, *b* adjacent to the centre point of the sensing unit 1. The two small openings 6*a*, 6*b* are both arranged within the central circle 17 onto which the connector pads 16 are arranged. The tensioning wire 37 is accommodated in the axially extending hollow space of the elongate member 32. The tensioning wire 37 leaves the a, b elongate member 32 on the tip of the axial end portion 34. In the illustrated embodiment, the tensioning wire 37 forms a loop where an anchoring element of the calorimeter can hook in. During use, the anchoring element pulls the sensing unit 1 against the upper end face of the furnace and ensures thereby a constant and reliable thermal contact between the heat source, which is in this embodiment the furnace, and the sensing unit 1.

Figure 6:
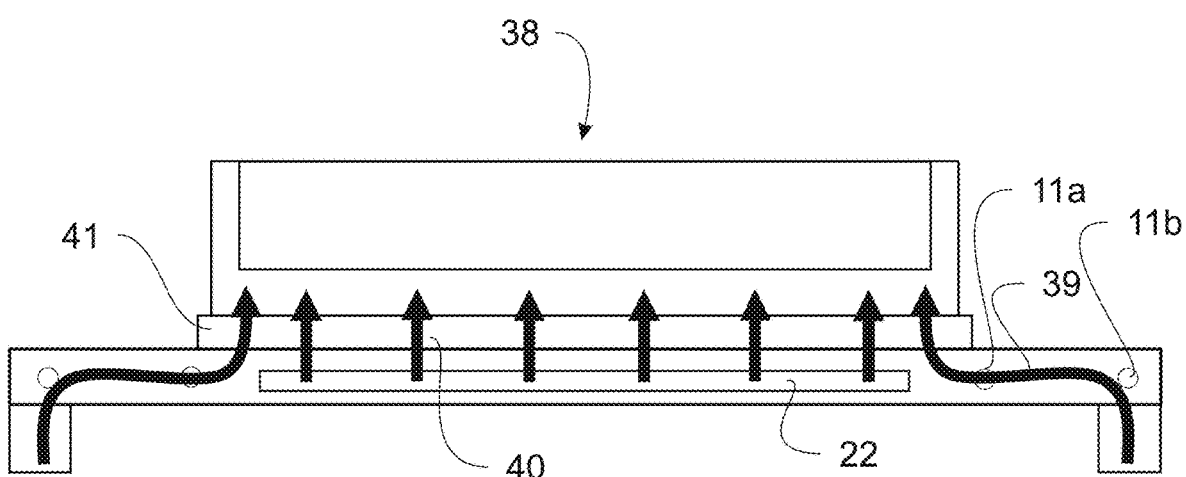
FIG. 6 is a schematic partial section of one of the measuring regions in a plane normal to the layer planes of FIGS. 2 to 5.

FIG. 6 schematically illustrates one of the pan support regions R, S in a section normal to the top surface 2 of the sensing unit 1 and having an empty pan 38 deposited thereon. The sensing unit 1 shown in this embodiment comprises a pan support 41, but no absolute temperature measurement arrangement 27. The pan support 41 is an additional layer which is only locally applied in the pan support regions R, S and which reduces the thermal resistance between the bottom of the pan and the uppermost electrically insulating layer of the multi-layer structure. In this highly schematic illustration, the radially inner and outer small circles symbolize the thermoelectric junctions 11a and 11b of the inner and outer circles 14 and 15, respectively, that define the radial extent of the measuring region between them. Further, the resistive heating pattern 22 beneath the bottom of the pan 38 is illustrated in a highly schematic manner only. The curved arrows 39 visualize the path of heat flow from the furnace to the pan 38, while the straight arrows 40 visualize the flow of heat from the electrical heater arrangement, realised by the resistive heating traces 22, to the pan 38 and further to any sample substance (not shown) within the pan.

Figure 7:
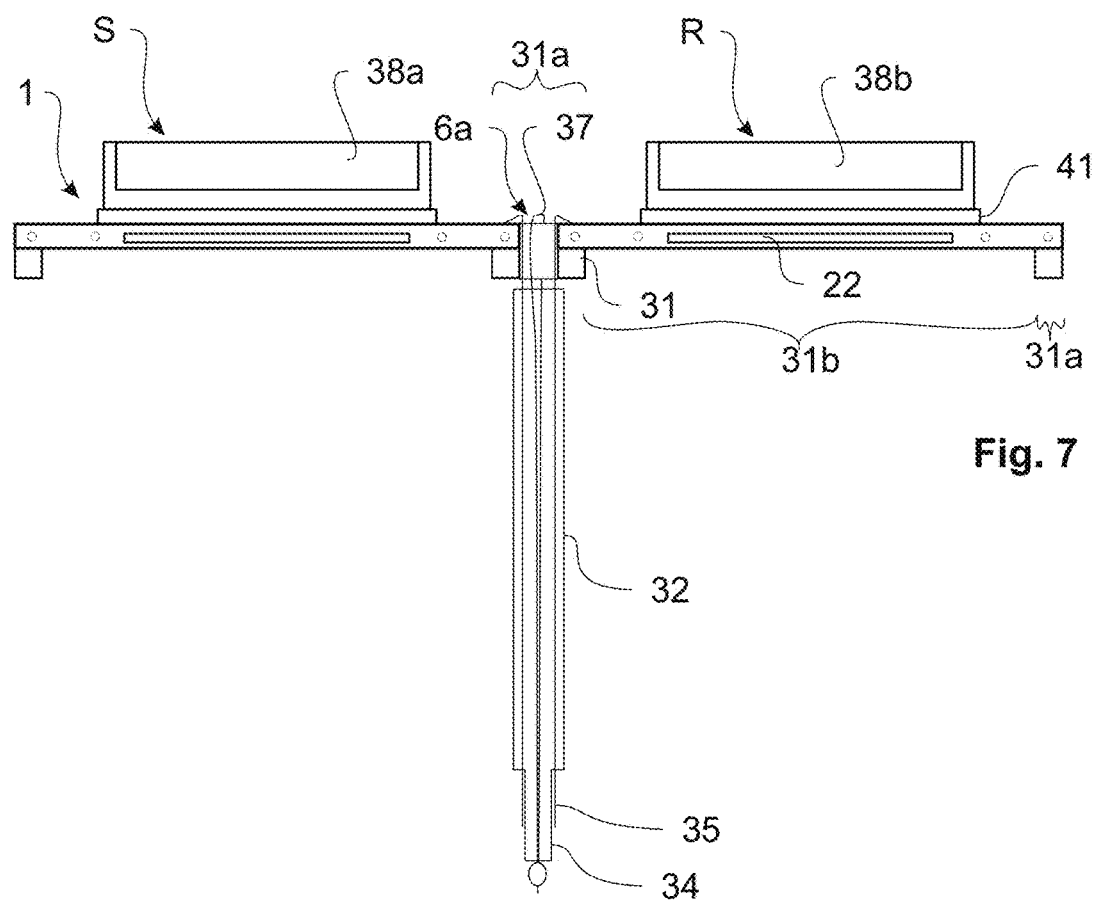
FIG. 7 is a schematic partial section of the sensor assembly in a plane normal to the layer planes of FIGS. 2 to 5.

FIG. 7 shows the sensor assembly comprising the sensing unit 1 and the elongated member 32 which are connected with the tensioning wire 37 in a section normal to the top surface 2 of the sensing unit 1. The sensing unit 1 comprises the disc-like substrate 31 which varies in its thickness: It has a reduced thickness 31b beneath the sample-side and reference-side measuring regions and below the sample-side and reference-side pan support regions and it has a greater thickness 31a outside of the measuring and pan support regions. Resistive heating traces 22 are arranged below the sample-side and reference-side pan support regions and above the disc-like substrate 31. The thermoelectric arrangements with the junctions 11a, 11b are arranged above the resistive heating traces 22 and in the measuring region. Pan supports 41 are arranged on top of the layer comprising the thermoelectric arrangements but in the respective pan support region.

The sensing unit 1 comprises a sample-side and a reference-side pan support region S, R and both of them are equipped with pan supports 41. In the embodiment shown in FIG. 7, a sample pan 38a and a reference pan 38b are arranged on the respective pan supports 41.

One of the two openings 6a is shown in FIG. 7. The tensioning wire 37 as well as connecting wires, which connect the connector pads 16 with the respective contact lugs 35 at the axial end portion 34 of the elongated member 32 run through the inside of the elongated member 32. The tensioning wire 37 ends in a loop where an unshown anchoring element can hook in and pull the sensing unit 1 towards the upper end of the furnace.

FIG. 7 shows the symmetry of the sensor assembly with respect to a plane passing through the center point of the sensing unit which is perpendicular to a straight line through center points of the sample-side pan support region, the reference-side pan support region and the sensing unit. The symmetry with respect to this plane is only broken by some details in the wiring between the connector pads 16 and the structural elements on the sample-respectively the reference-side.

LIST OF REFERENCE SIGNS

1 sensing unit
2 top surface
3 locating tabs
4 circular circumference
5 arc-shaped indications
S, R sample-side, reference-side pan support regions
6 center point of sensing unit
6a, b openings (for tensioning wire)
7, 8 center points of the sample-side/of the reference-side
9 first layer of the thermoelectric arrangement
10 second layer of the thermoelectric arrangement
11a, 11a', 11b, 11b' thermoelectric junction
12 first thermoelectric material
13 second thermoelectric material
14, 15 inner/outer circles (measuring region)
16 connector pads
17 central circle
18, 19 terminal traces
18a, 19a connecting traces
20 through-contacts (Connection between layers of thermoelectric arrangement)
21 layer of electrical heater arrangement
22 resistive heating traces
23, 24 power supply terminals
25 trace
26 trace
27 layer of absolute temperature measurement arrangements
28, 28' linear sections
29 inner turning section
30, 30', 30", 30a, 30b outer turning section
31 disc-like substrate
32 elongate member
33 outer surface
34 axial end portion
35 contact lugs
36 guide surface
37 tensioning wire
38 pan
39 curved arrows
40 straight arrows
41 pan support

What is claimed is:
1. A sensing unit for a differential scanning calorimeter comprising:
    a disc-like substrate suitable for being mounted in heat conductive contact with a temperature-controlled heat source of said differential scanning calorimeter, said disc-like substrate comprising:
        sample-side and reference-side pan support regions adapted to receive thereon in heat conductive contact therewith a bottom of a sample pan and a reference pan, respectively;
        sample-side and reference-side thermoelectric arrangements for generating between two terminal portions thereof sample-side and reference-side electrical voltage signals, respectively, indicative of flows of heat across sample-side and reference-side measuring regions, respectively; and sample-side and reference-side electrical heater arrangements beneath said sample-side and reference-side pan support regions, respectively; and sample-side and reference-side absolute temperature measurement arrangements beneath said sample-side and reference-side pan support regions, respectively.

2. The sensing unit of claim 1, wherein:

a thickness of said disc-like substrate is reduced beneath said sample-side and reference-side measuring regions, respectively.

3. The sensing unit of claim 1, wherein:

each of said sample-side and reference-side electrical heater arrangements comprises a resistive heating trace meandering between a central portion and a peripheral portion of said sample-side and reference-side pan support regions, respectively.

4. The sensing unit of claim 1, wherein:

each of said sample-side and reference-side absolute temperature measurement arrangements comprises a temperature sensitive resistive trace meandering in a pattern that is symmetric in relation to a central axis across said sample-side and reference-side pan support regions, respectively.

5. The sensing unit of claim 1, wherein the disc-like substrate further comprises:

a plurality of connector pads adapted for having external wiring connected thereto.

6. The sensing unit of claim 1, further comprising:

at least one locating tab formed at an outer circumference of said disc-like substrate and configured to be brought into a positive fit with a complementarily formed positioning recess of said differential scanning calorimeter.

7. The sensing unit of claim 1, further comprising:

a multi-layered structure arranged on an upper side of the disc-like substrate, whereby, starting from the disk-like substrate, the multi-layered structure comprises the following layers, in the following sequence:

a layer of electrical heater arrangements;

an insulating layer;

a second layer of thermoelectric arrangements;

an insulating layer;

a first layer of thermoelectric arrangements; and an insulating layer;

whereby a layer of the absolute temperature measurement arrangements is arranged between the upper side of the disc-like substrate and the layer of the electrical heater arrangements; and whereby an additional insulating layer is arranged between the layer of the electrical heater arrangements and the layer of the absolute temperature measurement arrangements.

8. A sensor assembly comprising:

the sensing unit of claim 1; and an elongate member extending along a longitudinal axis, whereby an axial end portion of the elongate member comprises an electrical contact arrangement to thereby form a plug member to be brought into electrical contact with a complementarily formed socket member of said differential scanning calorimeter, where said electrical contact arrangement is electrically connected to connector pads of said sensing unit.

9. The sensor assembly of claim 8, wherein:

said elongate member has a cylindrical outer circumference; and said electrical contact arrangement comprises elongate contact lugs that extend parallel to said longitudinal axis and are mutually spaced along the outer circumference and are electrically connected with said connector pads by connecting wires that are arranged in an axially extending hollow space formed in said elongate member.

\* \* \* \* \*